2,808,336
ORAL FAT EMULSIONS

Joseph Kalish, Jamaica, N. Y., assignor to Schenley Industries, Inc., New York, N. Y., a corporation of Delaware No Drawing. Application February 25, 1953, Serial No. 338,875

3 Claims. (Cl. 99—118)

The present invention is an oral fat emulsion for use in human and animal nutrition.

Oral fat emulsions have been used for the treatment of the underweight, the ill and convalescent who have lost weight, are losing weight or are unable to eat adequately for a variety of reasons, and as sources of "quick energy." Such oral fat emulsions have generally consisted of suspensions of from 40 to 50 percent of a fat, such as peanut oil, in an aqueous sucrose or glucose solution comprising from 5 to 10 percent by weight of the saccharide based on the volume of the emulsion, together with an emulsifying agent, such as lecithin or purified soybean phosphatide, and a small proportion of a synthetic emulsifier, for example, an alkylarylpolyether alcohol.

Such oral fat emulsions have often supplied all or a portion of the caloric needs of the ill or convalescent patient. At those times, when the nutritional requirements of a patient may be greater, the consumption of food by the patient is frequently diminished, resulting in a caloric deficit and consequent metabolic conversion of ingested protein for energy. This leads to a loss of weight and lack of protein to replace lost tissue, as revealed in a negative nitrogen balance. The loss of weight that is not directly attributable to the original causes, may produce a variety of complaints, such as restlessness, weakness, insomnia, excessive fatigue and further anorexia, which further decreases the already inadequate food intake. Accentuation of these complaints is found particularly in illnesses that are associated with increased metabolic rates.

Oral fat emulsions have made it possible to supply some of the caloric deficit that could not be adequately provided by dietary supplements containing large amounts of carbohydrate and protein. Such dietary supplements have a caloric value of only 4 calories per gram, while that of fat itself is 9 calories per gram. Fat emulsions tend to overcome the problem of inadequate caloric intake by increasing palatability. Their principal virtue is their combination of caloric density with palatability.

The oral fat emulsions heretofore described lack certain desirable features. Because of the nature of the fats used (peanut oil, corn oil, etc., which have high iodine numbers) they were unstable toward atmospheric oxidation and developed rancidity rapidly. The emulsion itself, because of the nature of the emulsifying agents and other ingredients that were used, also lacked shelf stability, that is, the emulsion broke and settled on standing for long periods. Instability in the presence of acids such as are encountered in the stomach has also been a feature of such emulsions that it would be desirable to overcome, if possible. The palatability of such emulsions oftentimes changes on aging and the appearance of an emulsion that has separated is not only referred to as pharmaceutically "inelegant" but is likely to create revulsion in the patient to its ingestion. The addition of flavoring agents is not normally sufficient to compensate for these undesirable features; on the contrary, the patient may, during the course of treatment, develop an aversion to the flavoring material itself, especially over long periods.

The principal object of the present invention is to provide an oral fat emulsion of high caloric value that is characterized by exceptional palatability and stability to atmospheric oxidation or rancidification. It is a further object of the present invention to provide such an oral fat emulsion that does not readily separate on standing and that is not readily broken by contact with acidic fluids. A still further object of the invention is to provide such an emulsion that is easily digested and is well assimilated. Other objects and advantages of the invention, some of which are referred to specifically hereinafter, will be apparent from the purview of this specification.

A preferred example of an oral fat emulsion of the present invention is that composed of the following substances in the following proportions, which are specified in weight/volume percentages [these percentages represent parts by weight of the ingredients to parts by volume of the finished emulsion; that is, "50% weight/volume" of the refined coconut oil refers to 50 grams (or other parts by weight) of coconut oil which, together with the other ingredients, is brought with water to a combined volume of 100 milliliters (or other parts by volume)]:

| | Percent weight/volume |
|---|---|
| Refined coconut oil (solidification point 76° F.) | 50 |
| Sucrose | 12.5 |
| Tert.-butylhydroxyanisole | 0.01 |
| Glyceryl monostearate (emulsifying grade as specified herein) | 1.5 |
| Polyoxyethylene sorbitan monostearate (approximately 20 ethylene oxide molecules per molecule) | 2 |
| Water, sufficient to make 100% by volume. | |

The refined coconut oil has a low acid value, a low iodine number, and a solidification point of approximately 76° F. (approximately 25° C.). When used in the oral fat emulsions of this invention it has a completely bland taste, imparting to the composition maximum palatability. It is also much more inherently resistant to oxidation than other fatty oils which have heretofore been used in such compositions. To retard any incidental oxidation, however, the specified small amount of tertiary-butylhydroxyanisole may be added to commercial preparations or to preparations that are not destined for use within short periods. It is essential, if the product is to be stable and not discolor on storage, that it be free from ester antioxidants such as propyl gallate and others normally used in fats to retard rancidification. The proportion of oil in the emulsion, which has a caloric value of 9 calories per gram, may be varied within rather wide limits, dependent upon the caloric value desired, but is preferably maintained within the range between 40 and 55 percent by weight/volume.

The sucrose is the major source of readily available carbohydrate but may be replaced entirely or partially by glucose or other water-soluble nutrient saccharides, especially if a reduction in sweetness is desirable. The content of saccharide may be varied within rather wide limits, dependent upon the palatability and sweetness desired. Sucrose has a caloric value of approximately 5 calories per gram. Preferred ranges of sucrose are between 5 and 20 percent by weight/volume.

The emulsifying agent, glycerol stearate, is an essential ingredient of the composition and its composition and proportions require control. The glyceryl stearate should be an emulsifying grade which contains approximately 10% by weight of sodium stearate and whose glycerides fall within the following distribution ranges:

| | Percent |
|---|---|
| Monoglycerides | 30–40 |
| Diglycerides | 40–50 |
| Triglycerides | 10–20 |

Such a glyceryl stearate is tasteless, edible, and is nontoxic in the amounts used. The quantities of the emulsifying agent may be varied between the range of 0.5 to 3.0 percent weight/volume of the emulsion, dependent upon the fineness and stability desired. The specified quantity (1.5%) appears to be optimum for an emulsion of cream-like consistency.

Although an emulsion without polyoxyethylene sorbitan monostearate may be used satisfactorily when freshly prepared and does retain its cream-like consistency without breaking for a long period, the addition of at least 1.0% by weight of polyoxyethylene sorbitan monostearate (in which 20 ethylene oxide molecules are combined in each molecule) is necessary to provide long shelf life. Furthermore, the incorporation of such an amount of the polyoxyethylene sorbitan monostearate is necessary to prevent breaking of the emulsion in contact with acid fluids. The emulsion of the present invention was found to be still completely emulsified after several hours in the stomachs of rats to which it had been administered, while emulsions that did not contain it had broken under the same conditions. Polyoxyethylene sorbitan monostearate (having 20 combined ethylene oxide molecules) is sold under such trade-names as Tween 60 and is tasteless and nontoxic in the amounts used in the emulsions of this invention. The polyoxyethylene sorbitan monostearates having 20 combined ethylene oxide molecules are substantially water-soluble while those having fewer (such as Tween 61, which has only 4 combined ethylene oxide molecules) are substantially water-insoluble. Other emulsifying agents or combinations of emulsifying agents failed to produce results that were the equivalents of the combination of the glyceryl stearate and polyoxyethylene sorbitan monostearate; polyoxyethylene sorbitan monolaurate, for example, is not tasteless.

The ingredients of the emulsion are incorporated together by conventional procedures. A convenient method consists in heating them together with constant stirring at a temperature between 50° and 80° C. (70° C. is preferred) and thereafter passing the emulsion through a homogenizer sufficient to produce particles having an average size between 1 and 2 microns, although emulsions having particles up to 5 microns in diameter produce satisfactory emulsions.

The emulsion as thus prepared has a cream-like consistency, is remarkably resistant to rancidification and to breaking, even in contact with acidic liquids, and has a life that, in accelerated shelf-life tests, is approximately three times as long as that of commercially available peanut oil emulsions emulsified with lecithin and synthetic emulsifiers. Thirty (30) cubic centimeters (two tablespoons) provide a caloric equivalent of 150 calories. The emulsion is entirely compatible with water, milk and hot beverages and may be mixed readily with ice cream, cereal, fruits and other foods to supplement their caloric value. The oral fat emulsions of the present invention may be diluted extensively with water (two or more volumes) without settling or losing their cream-like consistency over prolonged periods of time.

Although the size of the fat particles in such emulsions appears to be related to palatability, its effect on absorption or utilization for providing the requisite caloric input is still not established. It may be that an emulsion which, when brought into contact with the acidic fluids of the stomach, coagulates to form larger particles, will provide just as great a caloric input in the normal case as one that remains stable and is not affected substantially by acids. But in the exceptional case, in which the digestive function of the individual is impaired, an emulsion that does not coagulate in the presence of acid appears to be more desirable, and may be more completely utilized in the form of small particles than is one composed of larger particles.

The oral fat emulsions of the present invention are more homogeneous and its fat particles are of smaller size than those of commercial peanut oil preparations heretofore available.

Optional constituents which may be added to the oral fat emulsions of this invention, and which are without deleterious or adverse effect when so combined, are the following:

Sodium benzoate, in amounts from 0.1 to 1.0% weight/volume or other preservative to prevent or retard fermentation of the saccharide.

Sodium salt of ethylenediaminetetraacetic acid (known under such trade names as Sodium Sequestrene) in amounts from 0.01 to 0.02%, to chelate or sequester copper and iron ions, should any be present in the ingredients used, and thereby prevent the metal ions from catalytically hastening oxidation of the coconut oil.

Flavoring materials, such as vanillin, in small amounts. Since the emulsion of this invention is tasteless or has a bland taste, the use of flavoring agents, to which some patients have or may develop aversions, is preferably avoided.

Inasmuch as the foregoing specification comprises preferred embodiments of the invention it is to be understood that the invention is not limited thereto and that variations of the proportions and in the method of preparation, as well as other conventional modifications, may be adopted without departing from its purview or the scope of the appended claims.

I claim:

1. A palatable, fluid fat emulsion for oral ingestion to provide supplemental alimentation, which has a cream-like consistency, a substantial shelf life and the fat particles of which have an average diameter not in excess of 2 microns, which consists essentially of an aqueous suspension containing approximately 50 percent of a refined coconut oil having a solidification point of approximately 76° F., approximately 12.5 percent of sucrose, 1.5 percent of an emulsifying grade of glyceryl monostearate containing approximately 10 percent by weight of an alkali-metal stearate, and 2 percent of polyoxyethylene sorbitan monostearate having approximately 20 ethylene oxide units per molecule, each of the said percentages based upon parts by weight to parts by volume of the emulsion.

2. A palatable, fluid fat emulsion for oral ingestion to provide supplemental alimentation, which has a cream-like consistency, a substantial shelf life, and the fat particles of which have an average diameter not in excess of 2 microns, which consists essentially of an aqueous suspension containing each of the following four ingredients in approximately the following ranges of percentages (representing parts by weight to parts by volume of the emulsion):

|  | Percent |
|---|---|
| a. Refined coconut oil having a solidification point of approximately 76° F | 40 to 55 |
| b. Saccharide of the group consisting of sucrose, glucose and mixtures thereof | 5 to 20 |
| c. Emulsifying grade of glyceryl monostearate | 1.5 to 3.0 |
| d. Water - soluble polyoxyethylene sorbitan monostearate having approximately 20 ethylene oxide units per molecule | 1 to 2 |

3. A fluid fat emulsion as defined in claim 1 in which the sucrose is partially replaced by glucose.

References Cited in the file of this patent

UNITED STATES PATENTS

| 987,849 | Block | Mar. 28, 1911 |
| 1,216,052 | Beckman et al. | Feb. 13, 1917 |
| 1,302,486 | Dunham | Apr. 29, 1919 |
| 1,445,434 | Gerstenberger | Feb. 13, 1923 |
| 2,422,486 | Johnston | June 17, 1947 |
| 2,671,027 | Cross | Mar. 2, 1954 |

OTHER REFERENCES

Bailey: "Industrial Oil and Fat Products," 2d edition, 1951, page 134.